(12) United States Patent  
Homer et al.

(10) Patent No.: US 7,433,181 B2  
(45) Date of Patent: Oct. 7, 2008

(54) COMPUTER WITH DATA DRIVE UNDER KEYBOARD

(75) Inventors: Steven S. Homer, Tomball, TX (US); Paul Doczy, Cypress, TX (US); Mark Solomon, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1093 days.

(21) Appl. No.: 10/732,129

(22) Filed: Dec. 10, 2003

(65) Prior Publication Data

US 2005/0128676 A1 Jun. 16, 2005

(51) Int. Cl.
*G06F 1/16* (2006.01)

(52) U.S. Cl. .................... 361/683; 361/685

(58) Field of Classification Search .................. 361/683, 361/680, 685
See application file for complete search history.

(56) References Cited

U.S. PATENT DOCUMENTS

| | | | |
|---|---|---|---|
| 5,247,428 A | 9/1993 | Yu | |
| 5,280,467 A | 1/1994 | Wanger et al. | |
| 5,355,357 A * | 10/1994 | Yamamori et al. | 361/680 |
| D365,806 S * | 1/1996 | Hayami et al. | D14/319 |
| D370,214 S * | 5/1996 | Kondo | D14/319 |
| D370,216 S * | 5/1996 | Kondo | D14/319 |
| 5,526,226 A * | 6/1996 | Katoh et al. | 361/680 |
| 5,555,487 A * | 9/1996 | Katoh et al. | 361/680 |
| 5,572,399 A * | 11/1996 | Shirato et al. | 361/680 |
| 5,576,929 A * | 11/1996 | Uchiyama et al. | 361/680 |
| 5,629,832 A | 5/1997 | Sellers | |
| D387,037 S * | 12/1997 | Horiki et al. | D14/318 |
| 6,307,736 B1 * | 10/2001 | Song et al. | 361/680 |
| 6,385,042 B1 * | 5/2002 | Chen | 361/686 |
| 6,654,896 B1 | 11/2003 | Saunders et al. | |
| 2002/0027769 A1 * | 3/2002 | Kasahara et al. | 361/683 |

* cited by examiner

*Primary Examiner*—Lisa Lea-Edmonds

(57) ABSTRACT

A portable electronic device includes a base portion; an electronic display rotatably connected to the base portion; a keyboard in communication with the display, rotatably connected to the base portion, and movable between a closed position and an open position; and a first optical data drive formed in the base portion under the keyboard with access to the first optical data drive provided when the keyboard is rotated to the open position.

16 Claims, 3 Drawing Sheets

COMPUTER WITH DATA DRIVE UNDER KEYBOARD

BACKGROUND

Portable computing devices (such as laptop and notebook computers) are often unitary devices having a clam-shell configuration. These devices have a base portion connected to a display or monitor. The base portion often includes a keyboard, hard drive, floppy drive, central processing unit, and memory; and the display includes a viewing screen or panel. In the clam-shell configuration, the display pivotally connects to the base and moves between open and closed positions. In the closed position, the base and display lay on top of each other so the computing device has a reduced, compact size. In the open position, the display is disposed at an angle with respect to the base so the screen can be accessed or viewed.

Portable computing devices often include data storage drives (such as an optical disk drive, floppy disk drive, or the like) located in the base portion. The data storage drive may be accessed from the side or front of the base portion of the computing device. In some instances, the data storage drive is removable from the side or front portion of the base. As an example, a CD or DVD cartridge assembly can be inserted into and removed from a slot or cavity formed in the side of the base portion. Further, the base portion or cartridge assembly may include a motorized slide-out assembly for ejecting the cartridge assembly or a data storage medium (such as a CD or DVD) from the computing device.

Size, weight, performance, and cost are often important design considerations for computing devices. Improvements to these considerations can lead to more desirable and less expensive computing devices.

SUMMARY

In one embodiment, a portable electronic device comprises a base portion; an electronic display rotatably connected to the base portion; a keyboard in communication with the display, rotatably connected to the base portion, and movable between a closed position and an open position; and a first optical data drive formed in the base portion under the keyboard with access to the first optical data drive provided when the keyboard is rotated to the open position.

In another embodiment, a method of reading data from an optical storage medium, comprising: rotating a keyboard away from a base portion of a portable electronic device to provide access to an optical disk drive; attaching the optical storage medium to the optical disk drive; and rotating the keyboard to the base portion to connect the keyboard to the base portion and cover access to the optical disk drive.

Other embodiments and variations of these embodiments are shown and taught in the accompanying drawings and detailed description.

DETAILED DESCRIPTION

Figure 1:
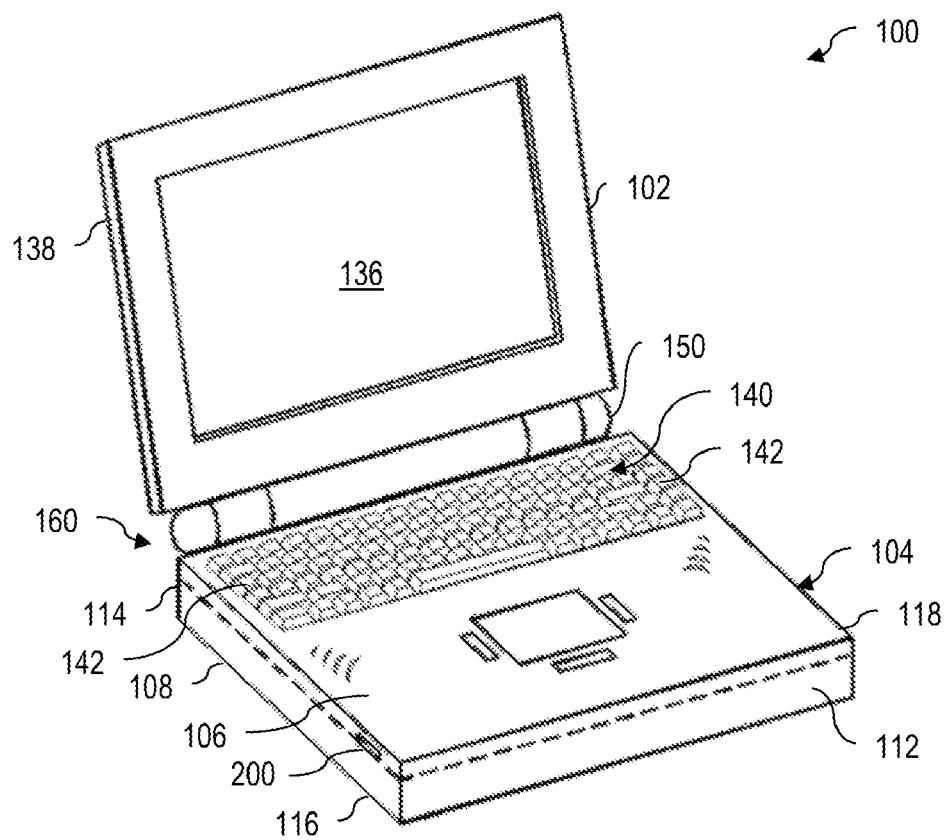
FIG. 1 is a perspective view of a portable electronic device in an open configuration according to an exemplary embodiment of the invention.
Figure 2:
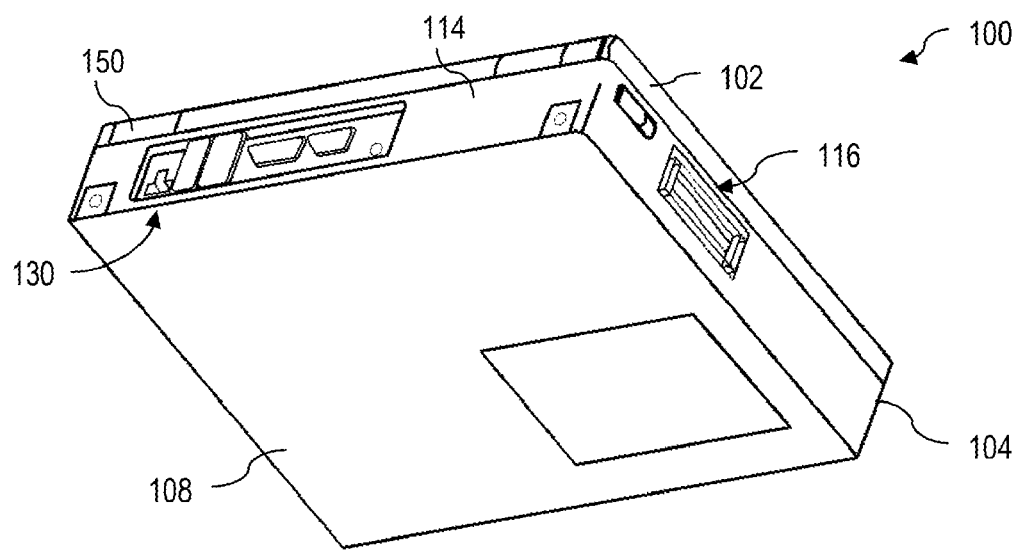
FIG. 2 is a perspective view of the portable electronic device of FIG. 1 in a closed configuration.

FIGS. 1 and 2 show a portable computing or electronic device 100 according to an exemplary embodiment of the invention. For convenience of illustration, the portable electronic device 100 is illustrated as a laptop or notebook computer. Embodiments in accordance with the present invention, though, are not limited to laptop or notebook computers. By way of example, embodiments in accordance with the present invention include, but are not limited to, computers (portable and non-portable), laptops, notebooks, personal digital assistants (PDAs), tablet PCs, handheld and palm top electronic devices, compact disc players, portable digital video disk players, radios, cellular communication devices (such as cellular telephones), and other electronic devices and systems whether such devices and systems are portable or non-portable.

FIGS. 1 and 2 show portable electronic device 100 as a notebook or laptop computer. Portable electronic device 100 includes display portion 102 hinged to a base portion or case 104. Base portion 104 is divided into top portion 106 and bottom portion 108 and four sides designated as front side 112, back side 114, left side 116 and right side 118.

The base portion 104 has a generally rectangular or square body and may be configured in many different ways, such as different sizes and shapes. Further, the base portion 104 may comprise and house a variety of different electronic components. By way of example only, the base can house and comprise a central processing unit (CPU), hard drive, memory, infrared ports, disk drives, PC card slots, batteries, USB ports, power connectors, monitor and display connectors, multibays, network connectors, CompactFlash card slots, power connectors, and other input/output (I/O) ports, just to name a few examples. Some of these features are generally shown at 130.

The display portion 102 generally comprises a view screen or panel 136 and a back surface 138. The screen 136 may be a touch sensitive screen that both displays data and inputs data when touched or activated. In other embodiments, the screen may only be capable of displaying information. In such embodiments, information can be input via a keyboard, a mouse, voice activation, or other means. By way of example, screen 136 may be a backlit color liquid crystal display (LCD). Data may be entered through the screen using, for example, a stylus or a user's finger. Images that appear on the screen provide a graphical user interface (GUI) and may be controlled with software (including handwriting recognition software) such that displayed images may be contacted or activated to input, edit, alter, or otherwise access information. When a user touches or activates a designated area on the screen, for example, the touch sensitive screen transmits a signal to the CPU.

The display portion 102, in some embodiments, can be electronically sophisticated and may function as a computing device. By way of example only, the display portion 102 can house and comprise a central processing unit (CPU), hard drive, memory, infrared ports, PC card slots, batteries, USB ports, power connectors, keyboard or monitor connectors, multibays, network connectors, CompactFlash card slots, power connectors, other input/output (I/O) ports, and numerous buttons and switches (such as Enter, Esc, Tab, Menu, Power, etc.), just to name a few examples.

As shown in FIGS. 1 and 2, the display portion 102 is mechanically coupled to the base portion 104 with a hinge assembly 150. The hinge assembly 150 enables the display portion 102 to pivotally move between an open position (shown in FIG. 1) and a closed position (shown in FIG. 2).

The top portion 106 of base portion 104 also includes a keyboard 140 that generally comprises a top surface with a plurality of keys 142. The keyboard 140 can function as a traditional "QWERTY" alphanumeric keypad or a traditional numeric keypad.

In alternate embodiments, the keyboard 140 comprises a flexible membrane keyboard having touch sensitive or pressure sensitive key areas on a planar surface. The keyboard could comprise opposed flexible plastic or polymeric membranes that house pressure sensitive switches identifiable with particular letters, numbers, symbols, and functions for inputting data into the computing device. Further yet, the keyboard 140 does not have to comprise a flexible membrane configuration or have any particular embodiment. The keyboard, for example, could have a hard plastic outer shell. Pressure or touch sensitive key areas could be disposed along an inner side of this shell.

Figure 3:
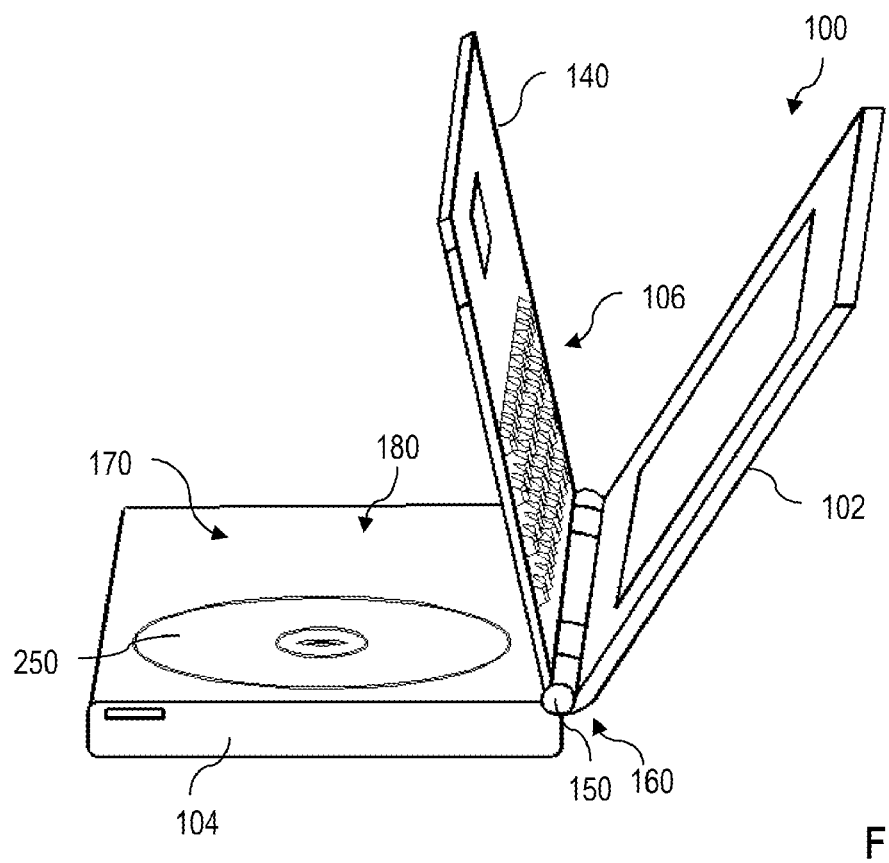
FIG. 3 is a perspective view of the portable electronic device of FIG. 1 with the keyboard in an open position.
Figure 4:
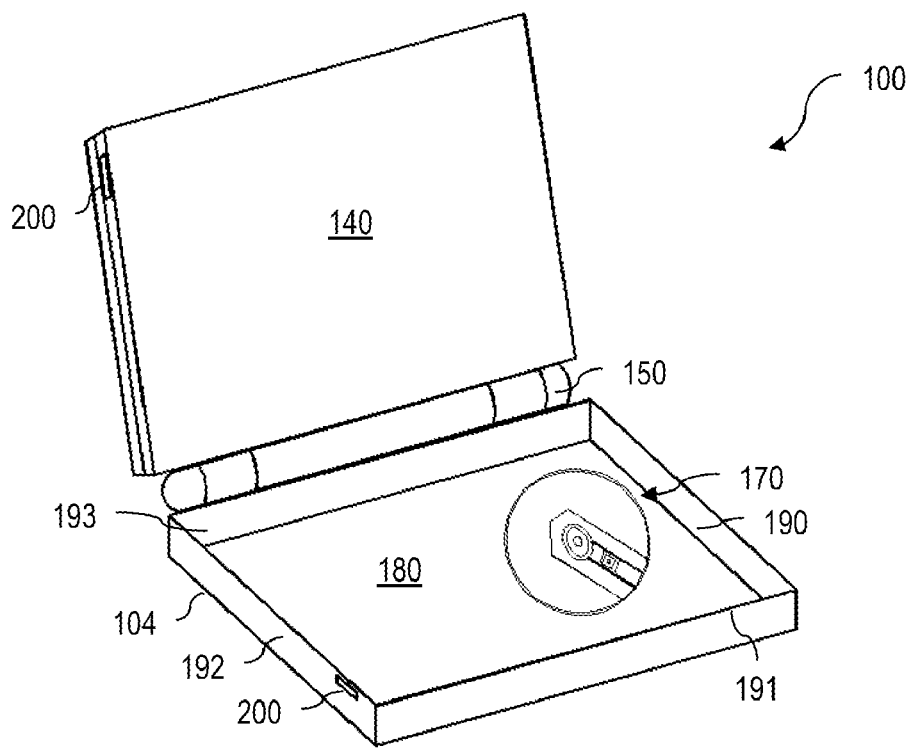
FIG. 4 is another perspective view of the portable electronic device of FIG. 1 with the keyboard in an open position.

As best shown in FIGS. 1, 3, and 4, the keyboard 140 is moveable between a closed position (shown in FIG. 1) and open positions (shown in FIGS. 3 and 4). One end 160 of the keyboard 140 is mechanically connected to the hinge assembly 150. As such, the keyboard 140 can rotate (see arrow "A" in FIG. 3) or pivot between the closed and open positions about the hinge assembly 150.

When the keyboard 140 is in the open position, a data drive 170 is accessible. The data drive has the ability to read data from and/or write data to a disk or other medium. The data drive 170 can be, for example, a disk drive, such as a hard disk drive (HDD), a floppy disk drive (FDD), a magnetic disk drive, an optical disk drive, or other drive or device for reading and/or writing data. For example, the data drive 170 can be an optical drive for use with optical media, such as compact disk (CD) memory, write-once-read-many (WORM) memory, magneto-optical (MO) memory, erasable optical (EO) memory, digital versatile disk (DVD) memory, or other types of optical memory.

As shown in FIGS. 1, 3, and 4, the keyboard 140 forms the top portion 106 of base portion 104. When the keyboard 140 is in an open position, a cavity or recess 180 is disposed in the base portion 104. Four walls 190-193 (shown in FIG. 4) define the cavity 180, and the data drive 170 is formed within the cavity 180.

In one exemplary embodiment, the data drive 170 is formed in the cavity 180 and not removable from the base portion 104. The data drive 170, for example, can be integrally formed into the base portion 104.

In another exemplary embodiment, the data drive 170 is removable from the base portion 104. For example, the data drive 170 can be formed with a separate housing or separate assembly that is mechanically and electrically attachable to and removable from the base portion 104. In this embodiment, a first data drive can be removed from the base portion 104 and replaced with a second data drive. This second data drive can be similar to or different from the first data drive. By way of illustration only, the first data drive can be a CD drive, and the second data drive can be a DVD drive.

In the embodiments in accordance with the present invention, a motorized slide-out tray or motorized ejection mechanism for removing or ejecting the data drive or for removing or ejecting a data disk is not required. In one embodiment, for example, since the data drive permanently resides within the base portion 104, no motorized slide-out tray is necessary to access the data drive 170. The data drive 170 is accessible when the keyboard 140 is lifted, rotated, or otherwise removed from the base portion 104.

When the keyboard 140 is in the closed position, the keyboard 140 forms the top portion 106 and, as such, forms a protective cover, lid, or housing for the data drive 170. In order to access the data drive 170, the keyboard is moved from the closed position (FIG. 1) to the open position (FIGS. 3 and 4).

The keyboard 140 may be connected to the base portion 104 in a variety of ways to facilitate the opening and closing of the keyboard. By way of example only, a latch or lock mechanism 200 can be provided on the base portion 104 and keyboard 140. The lock mechanism can comprise a fastener and notch that cooperate to lock the keyboard 140 while in the closed position. Upon actuation of the lock mechanism, the keyboard 140 releases from the base portion 104 so the keyboard can move to the open position. Those skilled in the art will appreciate that a variety of mechanisms can be utilized to connect the keyboard to the base portion so the keyboard can be locked in the closed position and then unlocked and moved to the open position.

The keyboard 140 can rotationally connect to the portable electronic device 100 in a plurality of different ways and still be within the scope and spirit of the invention. As shown in the figures, the keyboard connects to the hinge assembly 150. Other types of hinge or pivotal connections can be used as well.

Further, the keyboard 140 can be configured to be removable from the base portion 104. In an alternate embodiment for example, the keyboard 140 can be mechanically and electrically attached to the base portion 104 and then mechanically and/or electrically unattached from the base portion in order to provide access to the data drive 170. In this latter embodiment, the keyboard may be directly electrically connected to the portable electronic device 100 (via an electrical connection, such as a cable or wire for example) or not physically connected to the portable electronic device 100 (with data transmission occurring via wireless technology, via a remote location, or via other electronic devices, for example).

FIG. 3 shows one example implementation in accordance with the present invention. As shown, a storage medium 250 (such as a CD or DVD) is connected to the data drive 170. In order to attach the storage medium 250 to the data drive 170, the display portion 102 is rotated upwardly away from the base portion 104. The keyboard 140 is unlocked, unlatched, or disengaged from the base portion 104, for example with actuation of the lock mechanism 200 (FIGS. 1 and 4). The keyboard is then rotated upwardly away from the base portion and, for example, positioned adjacent to the display portion. With the keyboard in the open position, access to the data drive 170 is available. The storage medium 250 is then positioned onto or engaged with the data drive 170. The keyboard is then rotated downwardly toward the base portion and locked, latched, or engaged with the base portion, for example with actuation of the lock mechanism (FIGS. 1 and 4). The keyboard, in the closed position, now protects and/or covers the data drive 170 and the storage medium 250. Data can be written to and/or read from the storage medium with the keyboard in the closed position.

Figure 5:
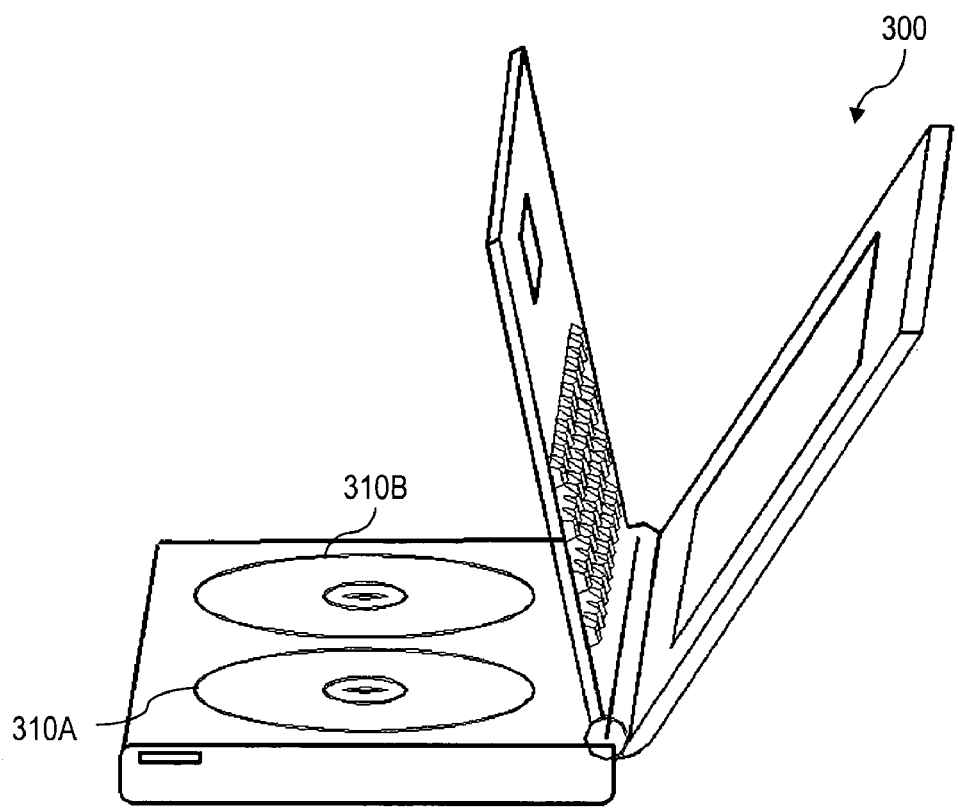
FIG. 5 is a perspective view of an alternate embodiment of a portable electronic device with the keyboard in an open position.
Figure 6:
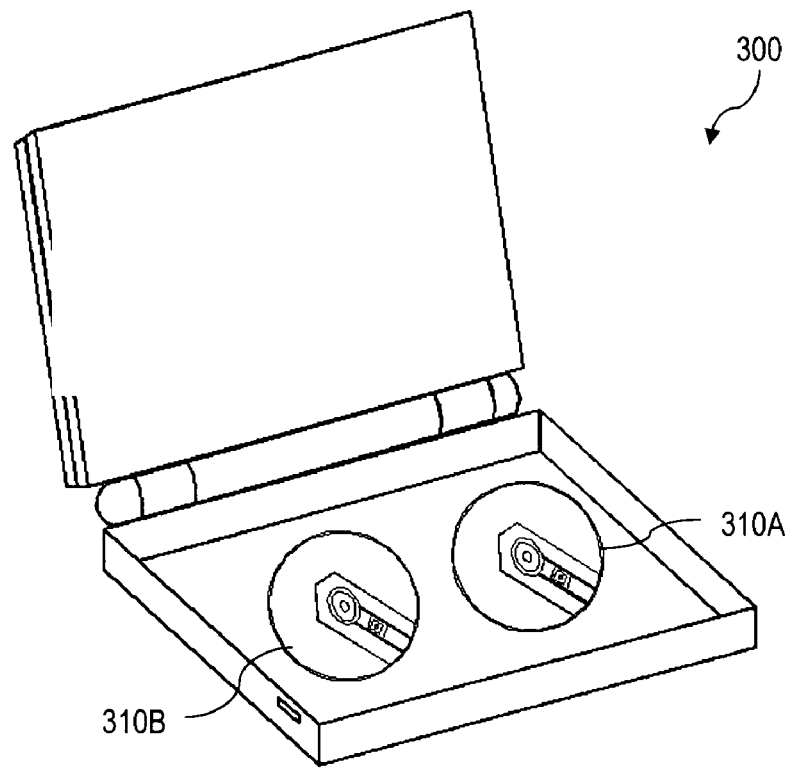
FIG. 6 is another perspective view of the portable electronic device of FIG. 5 with the keyboard in an open position.

FIGS. 5 and 6 show an alternate embodiment. Here, the portable electronic device 300 is similarly configured to the portable electronic device 100 shown in FIGS. 1-4. As one difference, the portable electronic device 300 includes two separate, adjacent data drives 310A and 310B. These drives can be similar, or they can be different. By way of example only, data drive 310A can be a first type of drive while data drive 310B can be a second and different type of drive. To illustrate, data drive 310A can be a CD drive, and data drive 310B can be a DVD drive, FDD drive, or other type of drive discussed herein. Of course, both data drives 310A and 310B can be similar, such as both drives being CD drives, DVD drives, etc.

While the invention has been disclosed with respect to a limited number of embodiments, those skilled in the art will appreciate, upon reading this disclosure, numerous modifications and variations. It is intended that the appended claims cover such modifications and variations and fall within the true spirit and scope of the invention.

What is claimed is:

1. A portable electronic device, comprising:
   a base portion;
   an electronic display rotatably connected to the base portion;
   a keyboard in communication with the display, rotatably connected to the base portion, and movable between a closed position and an open position; and
   a first optical data drive that uses a first type of storage medium and is formed in the base portion under the keyboard with access to the first optical data drive provided when the keyboard is rotated to the open position, wherein the first optical drive is removable from the base portion and replaceable with a second data drive that uses a second type of storage medium that is different than the first type of storage medium.

2. The portable electronic device of claim 1 wherein the first optical data drive is selected from the group consisting of a CD drive and a DVD drive.

3. The portable electronic device of claim 1 further comprising a second optical data drive formed in the base portion under the keyboard.

4. The portable electronic device of claim 3 wherein the second optical data drive is a different type of optical data drive than the first optical data drive.

5. The portable electronic device of claim 3 wherein the second optical data drive is adjacent the first optical data drive, with access to the second optical data drive provided when the keyboard is rotated to the open position.

6. The portable electronic device of claim 1 wherein access to the first optical data drive is provided only when the keyboard is rotated to the open position, and no access to the first optical data drive is provided when the keyboard is rotated to the closed position.

7. A method of reading data from storage media, comprising:
   rotating a keyboard away from a base portion of a portable electronic device to provide access to an optical disk drive;
   attaching an optical storage medium to the optical disk drive;
   rotating the keyboard to the base portion to connect the keyboard to the base portion and cover access to the optical disk drive;
   rotating the keyboard away from the base portion to access and replace the optical disk drive with a hard disk drive; and
   rotating the keyboard to the base portion to connect the keyboard to the base portion and cover access to the hard disk drive.

8. The method of claim 7 further comprising unlatching the keyboard from the base portion to rotate the keyboard away from the base portion.

9. The method of claim 8 further comprising latching the keyboard to the base portion to connect the keyboard to the base portion.

10. A portable computer, comprising:
    a base portion;
    an electronic display connected to the base portion;
    a keyboard in communication with the display and removably connected to the base portion to an open position; and
    a data drive that uses a first type of storage medium and is formed in the base portion under the keyboard with access to the data drive provided only when the keyboard is moved to the open position, wherein when the keyboard is in the open position the data drive is replaceable with a different data drive that uses a second type of storage medium different than the first type of storage medium.

11. The portable computer of claim 10 wherein the portable computer is selected from the group consisting of a notebook computer and a laptop computer.

12. The portable computer of claim 10 wherein the keyboard is mechanically detached from the base portion in the open position.

13. The portable computer of claim 10 further comprising a second data drive formed in the base portion under the keyboard.

14. The portable computer of claim 13 wherein access to the second data drive is provided only when the keyboard is moved to the open position.

15. The portable computer of claim 10 wherein the data drive is an optical data drive and the different data drive is a hard disk drive.

16. The portable computer of claim 10 wherein the data drive is selected from the group consisting of a compact disk (CD) drive, a write-once-read-many (WORM) drive, a magneto-optical (MO) drive, and a digital versatile disk (DVD) drive.

* * * * *